United States Patent [19]
Rossi et al.

[11] Patent Number: 5,313,536
[45] Date of Patent: May 17, 1994

[54] MODULAR PHOTONIC WAVEGUIDE DISTRIBUTION SYSTEM

[75] Inventors: Frank Rossi, Burlington, Vt.; Werner Straehle, Dettenhausen, Fed. Rep. of Germany

[73] Assignee: International Business Machines Corporation, Armonk, N.Y.

[21] Appl. No.: 990,870

[22] Filed: Dec. 15, 1992

[30] Foreign Application Priority Data

Dec. 18, 1991 [EP] European Pat. Off. ........ 91121665.3

[51] Int. Cl.⁵ .............................................. G02B 6/12
[52] U.S. Cl. ............................................ 385/14; 385/3; 385/4
[58] Field of Search ................. 385/1, 2, 3, 4, 14, 385/24; 359/117

[56] References Cited

U.S. PATENT DOCUMENTS

| | | | |
|---|---|---|---|
| 4,400,054 | 8/1983 | Biard et al. | 385/36 |
| 4,732,446 | 3/1988 | Gipson et al. | 385/24 |
| 4,809,358 | 2/1989 | Fernström | 359/117 X |
| 4,837,855 | 6/1989 | Hajikano et al. | 359/117 |
| 5,064,263 | 11/1991 | Stein | 385/14 |
| 5,109,444 | 4/1992 | Handa et al. | 385/14 |
| 5,131,061 | 7/1992 | Betts | 385/4 |

*Primary Examiner*—Rodney B. Bovernick
*Assistant Examiner*—Phan T. Heartney
*Attorney, Agent, or Firm*—J. Dennis Moore

[57] ABSTRACT

A modular photonic waveguide distribution system is disclosed which enables multi-directional and simultaneous communication within a multitude of coherent data processing units. The basic structure of an optical distributor element or module 1 is described and it is shown how the extension to complex data distribution structures can be achieved by respective combinations of the modules. Modes of operation and data selection are demonstrated.

11 Claims, 4 Drawing Sheets

MODULAR PHOTONIC WAVEGUIDE DISTRIBUTION SYSTEM

FIELD OF THE INVENTION

This invention relates to optical signal transmission in data processing systems. In particular an optical bus structure is disclosed which consists of modular couplers and serves for communication between several individual devices.

BACKGROUND OF THE INVENTION

Modern data processing systems commonly consist of a plurality of separate components such as processors, memory boards, input/output controllers, data storage devices and peripheral devices or terminals. Signals are transmitted between these components via a common bus. As computer systems become more complex, there is a continuing requirement for driving signals at faster clock rates while at the same time minimizing power, noise, and electro-magnetic interference. In order to avoid the inherent problems of electrically coupling data processing components, attention has shifted to optical techniques for data transmission.

Representative is U.S. Pat. No. 4,732,466, which employs a circuit board having an optical data bus. In this system each component includes an optical fiber network which in a composite sense forms an optical bus to interconnect computer components on the same board. The intensity of light emitted by a component is divided among various receivers so that the optical energy arriving at each receiver is reduced. If components are interconnected consecutively in a chain-like manner, each linked component receives significantly less intensity than the preceding one. Consequently this optical bus does not assure optical power uniformity, which is an essential requirement in digital data transmission.

Other techniques have been proposed in the art for using optical couplers for data transmission. U.S. Pat. No. 4,400,054 relates to an optical coupler used to transmit data from any one of N small optical channels by funneling to a single "large" optical channel. This technique does not provide an optical interconnection scheme for purposes of computer bus applications where all optical ports must be interconnected to allow bidirectional communication between any two devices.

A specific system for optical signal transmission is described in U.S. application Ser. No. 654,472 now U.S. Pat. No. 5,131,061. Modular fiber optic couplers are combined to form a bus structure in a fiber optic environment. Each coupler unit comprises optical and electrical input and output ports. Optical receivers and transmitters are connected to the optical ports and linked with the respective electrical ports by means of electronic logic control elements which are an integral part of each coupler unit. By interconnecting the electrical ports of several couplers in a network like structure, individual components linked by the optical bus can be addressed. During data receiving periods, however, no data can be sent from the same device simultaneously. Another disadvantage is the need of additional supply power and the respective interconnection parts as there are active electronic elements integrated on each coupler unit.

The present invention is intended to provide a new and advanced optical data distribution system using specific couplers or modules to realize complex optical bus structures or networks which allow selective and parallel data transfer among a plurality of devices.

SUMMARY OF THE INVENTION

This object is achieved by the inventive modular photonic waveguide distributing system as claimed, which utilizes unified passive coupler elements as modules which can be combined to a complex optical bus. Each module includes separate interface areas, such as sides. These areas serve as interfaces to other modules or directly to data processing devices. Each area comprises a set of optical input and output ports whereby the total amount of ports is correlated with the number of sides of the module.

The internal structure of the module is formed by transfer lines which serve as separated optical waveguiding paths. These paths can be construed e.g. as channels in a massive body with at least partially reflecting walls, as optic fibers, or as waveguiding lines integrated on a wafer's surface. Light received at an individual input port on any one side of the module is transferred to a respective output port of another side of the module. In general all input ports of any one side of a module are separately connected with output ports on different sides of the module. Thus from each side of the module optical signals can be selectively transmitted to all remaining sides. Correspondingly each side comprises the respective set of output ports which are separately conjoined to input ports of different other sides. This arrangement allows individual and bidirectional data transfer from each side to any other side of the module.

With these modules, comprising the described inherent distribution pattern, the construction of various optical bus structures is possible. High complexity can be achieved by simply combining identical modules to a respective network. As the inventive modular photonic waveguide distribution system is not restricted to specific configurations it can easily be adapted to modifications of the architecture of the processing system caused e.g. by changes in number or arrangement of interconnected data processing devices or terminals.

It is a specific advantage of the present invention that communication between a plurality of interconnected devices can take place in parallel and simultaneously. Due to the symmetric structure of the modules comprising isolated optical signal transfer lines, transmitted signals run on individual paths and are not influenced by simultaneously transferred data on other paths. This makes the inventive modular optic coupler technique applicable for data processing systems requiring high speed and multi-directional data transfer.

As light beams are not influenced when rectangularly crossed by others the waveguiding paths within a module may comprise direct crossings i.e. in the same plane. This allows integration of the module in a single layer on a substrate. On the other hand, if decreased of light beam intensities due to respective aperture effects caused by such crossing must be avoided, the waveguiding paths can be arranged separated from each other, e.g. in different planes, in a manner that no direct crossing of light beams occurs.

The modular coupling method of the present invention is not restricted to two-dimensional (2D) data distributing arrays. With respective shaped modules (e.g. cubic) or simply by stacking of '2D'-modules 3D-networks can be construed analogously. This concept can also be adapted to integration of multi-layer optical signal distribution structures.

No additional power supply is required as optical signals are transferred and distributed passively, i.e. without active optic or electronic elements. The loss of light intensity by passing a plurality of the described modules is negligible if the light guiding paths are of respective quality as can be achieved by techniques known in the art.

The simple and symmetric construction of the inventive modules allows easy manufacturing at low costs. For use in compact data processing systems the modules and respective bus structures can be miniaturized and implemented in integrated components.

BRIEF DESCRIPTION OF THE DRAWINGS

For a better understanding of the present invention, together with further objects and advantages, preferred embodiments of the invention are described in the following with reference to the accompanying drawings in which

FIG. 1b shows schematically the optical transfer paths within the module of FIG. 1a;

DETAILED DESCRIPTION OF THE PREFERRED EMBODIMENTS

Figure 1A:
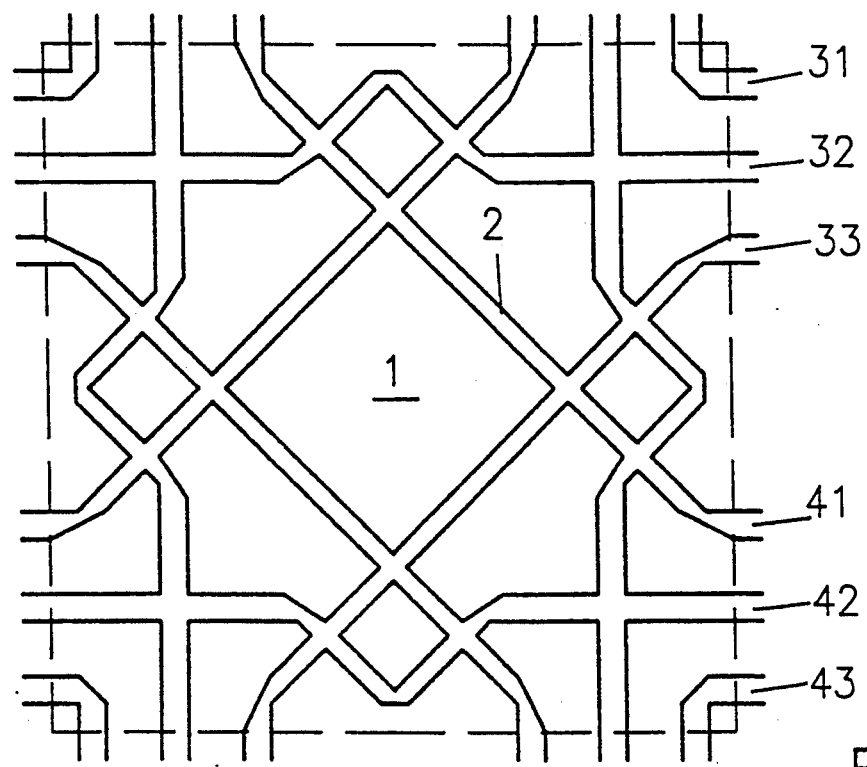
FIG. 1a is a top view plot of a preferred embodiment of a single photonic waveguide distribution module which could serve as coupling element of a complex data distribution system.

In FIG. 1a a top view of a photonic waveguide module 1 is drawn schematically. The shape of this preferred embodiment is quadratic, but other forms such as e.g. triangle, hexagon or others would be suitable as well. The module 1 comprises waveguiding paths 2 which can be produced as optic fibers or channels within a compact body or housing, or as transparent lines on a support surface. The dimensions of such a module can be reduced, e.g. down to about $200 \times 200 \mu$, where the waveguide linewidth is about 10 $\mu$m and the distances between the waveguides remain sufficient to avoid any interferences.

Figure 1B:
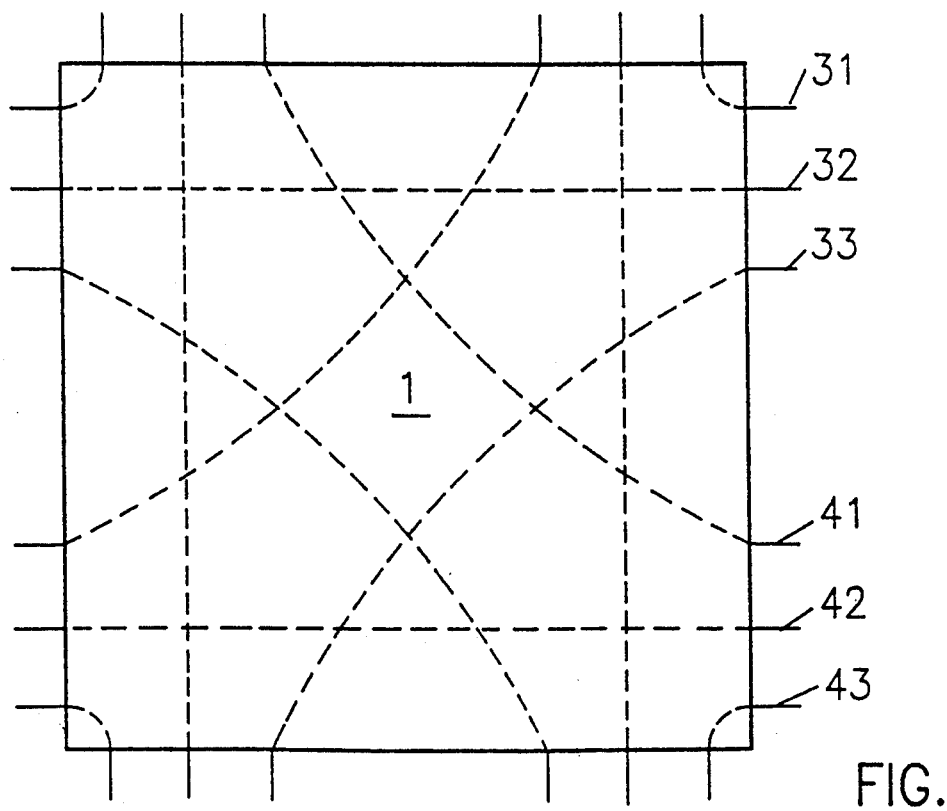

The waveguiding paths interconnect different sides of the module. Due to the symmetrical structure of the module, interconnections between the sides of the module are also symmetrical. Each side of the module comprises six optical ports. In one mode of operation on a first side of the module data signals were injected into three optical ports 31, 32, 33 and separately transferred to the three remaining sides. Correspondingly, signals from these other sides are individually received at the three remaining ports 41, 42, 43 and said first side.

data flow paths within the coupler module are shown more schematically in FIG. 1b. It is clear that each path can transmit light in both directions. Thus the module allows individual definition of each port as an input or output port, i.e. not only 3-inject/3-receive ports at each side are possible; non-symmetric arrangements with different usage of the ports at different sides of the module are also conceivable.

The total number of ports on each side of the module can also vary. For example if bytes of data are to transfer in parallel from side to side of the module, each dotted line of FIG. 1b can represent a respective parallel running "bundle" of waveguides interconnecting "byte-blocks" of optical ports.

Figure 2:
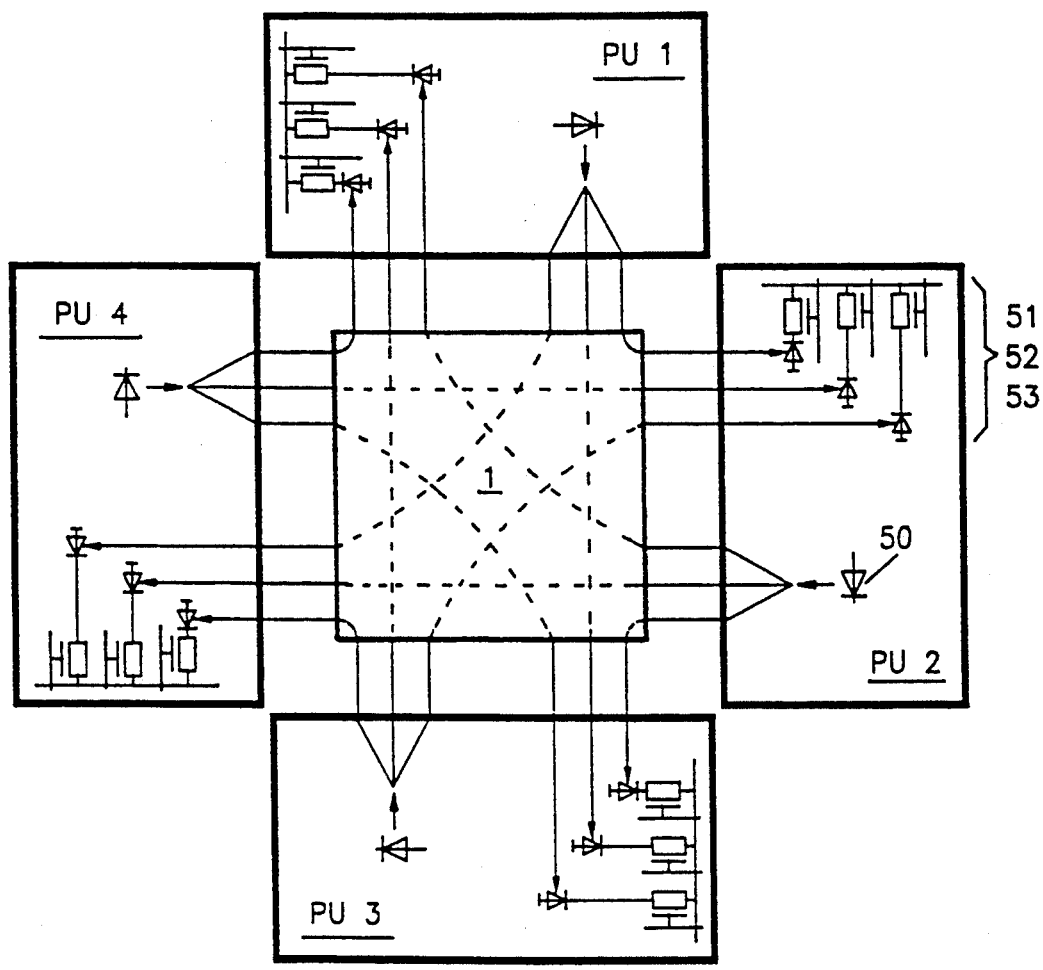
FIG. 2 demonstrates a specific operational mode of the module wherein four data processing units are interconnected, each comprising one output terminal and several input terminals.

FIG. 2 gives an example of an operational mode where a module couples four identical optical transmitter/receivers, or processing units (PU 1-4), in a symmetric manner. Each processing unit in this example comprises one optical data output terminal 50 and three optical data receivers 51, 52, 53, as shown in PU 2. Light is directed from the output terminal 50 to three ports on a first side of the module and thus transferred simultaneously to ports on other sides of the module. Optical signals from other PU's are received from the remaining ports on the first side of the module. In this arrangement each port is associated to another PU. This configuration allows high speed communication between the PU's whereby sending and receiving operations can be executed simultaneously.

Figure 3:
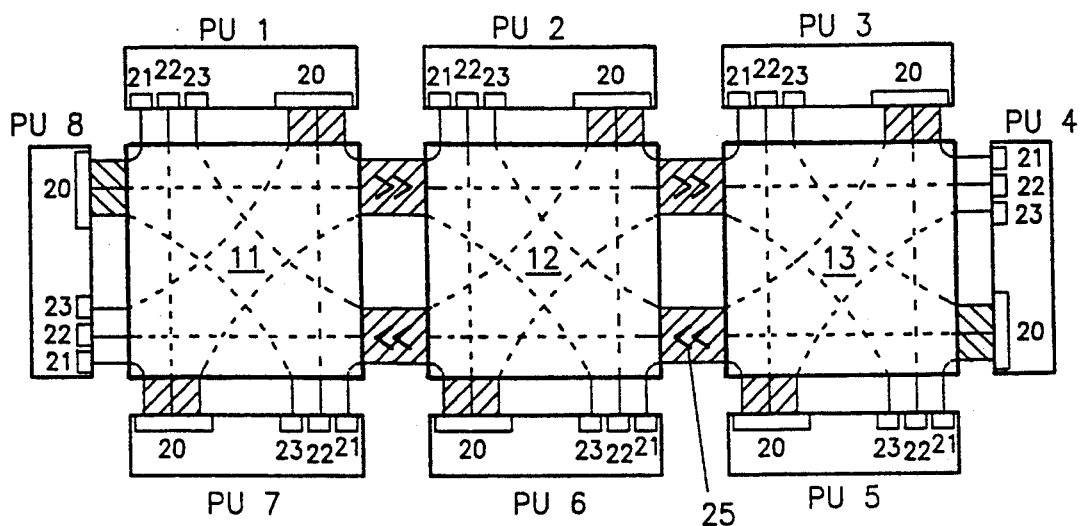
FIG. 3 is an example of combining modules for optical signal transfer within a set of data processing units.

Data distribution between a plurality of processing units (PU 1-8) by means of modular couplers 11, 12, 13 is shown in FIG. 3. Each side of a module serves as interface to other modules or to data processing units (PU). With this arrangement optical data are transferred between all PU's. In this example each PU sends data to three ports of a module's interface in parallel 20 and receives signals selectively 21, 22, 23 from three other ports of this interface. Data transfer 25 between the modules in this example is "tight together", i.e. not separated to comprise individual port to port interconnection. Thus PU's receive at least partially signals from different other PU's on the same input port. Identification of the originating PU in this case can be achieved by having each PU sending a typical heading sequence of signals followed by the data.

Figure 4:
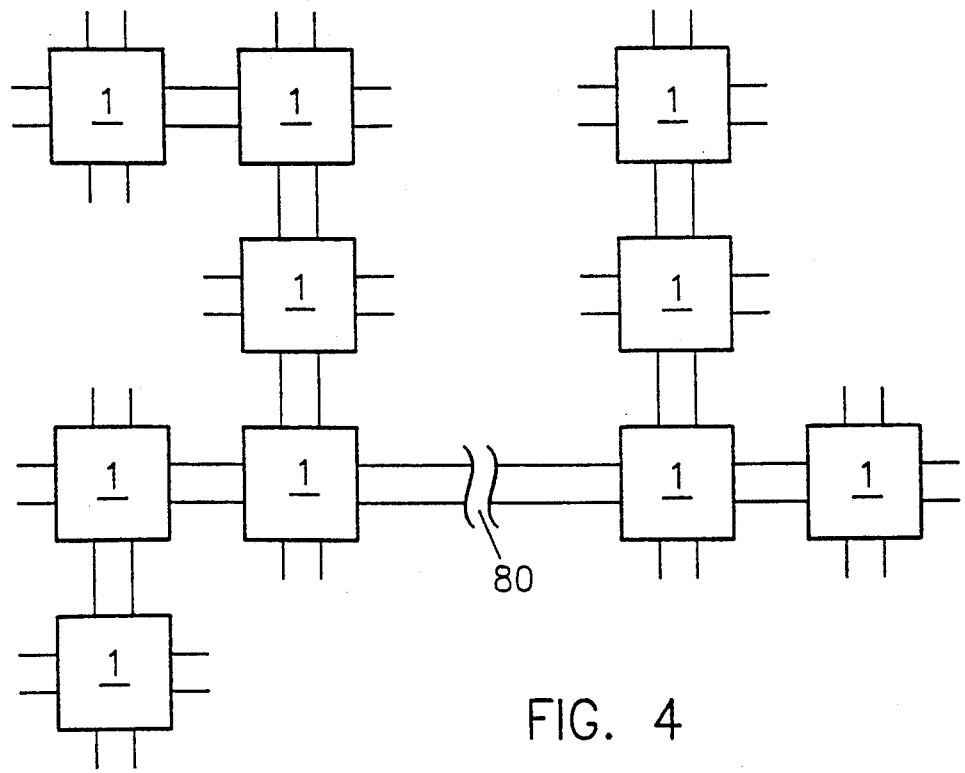
FIG. 4 shows schematically the interconnection of separate local bus structures by means of optical transfer cables.

In FIG. 4 two modular bus structures are interconnected by optical transfer cables 80, e.g. fibers. The busses consist of identical modules. Thus linking of distant local modular networks means simple connection of two identical interfaces.

Figure 5:
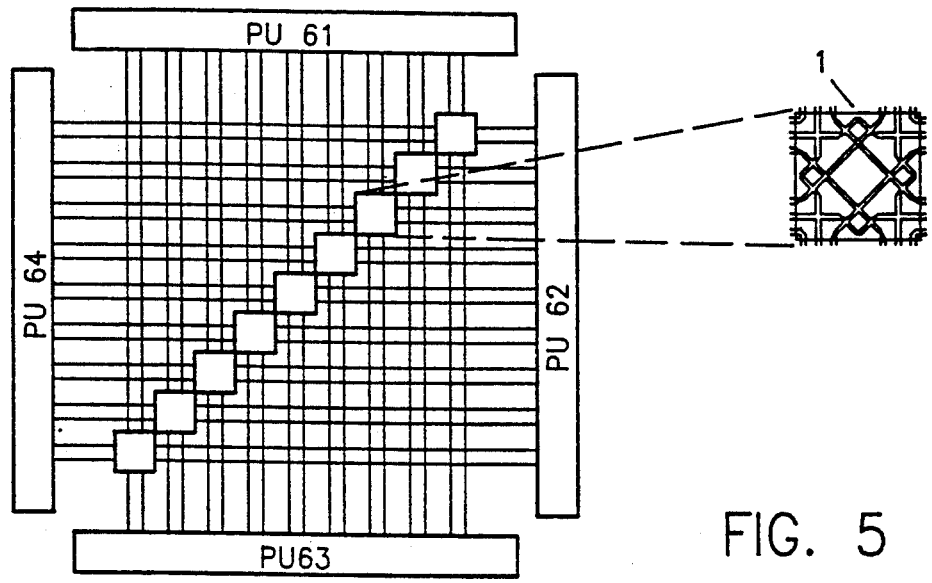
FIG. 5 is an example of combining the preferred modules of FIG. 1a to reveal a structure capable of being used as complex coupler element for interconnection of processing units with a plurality of data input/output terminals.
Figure 6:
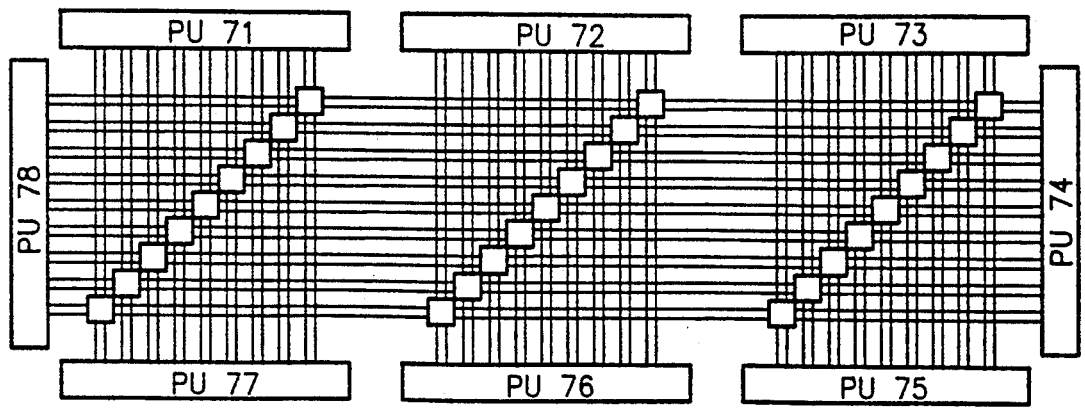
FIG. 6 demonstrates a combination of the complex coupler elements shown in FIG. 5 to form a bus structure for interconnection of processing units comprising a plurality of data input/output terminals.

Modern data processing units typically comprise a plurality of input and output terminals. Data distribution between these "multi-terminal" PU's requires high-level interconnection structures. The method disclosed in the present invention can be used to form respective high-level interconnections by combining low-level modules. Such a specific arrangement of modules is shown in FIG. 5. In this example signals are distributed between four processing units (PU 61-64), each comprising a multitude of data terminals. This structure can be interpreted as a high-level coupling "module" having functions comparable to those of the module 1 of FIG. 2. Accordingly data distribution within sets of more than four "multi-terminal" PU's can be accomplished by conjoining such "high-level" modules as already described above. An example is shown in FIG.

6 where eight "multi-terminal" PU's are coupled in a manner comparable to the arrangement shown in FIG. 3.

Although it is convenient to combine unified modules, it is obvious that arrangements of different types of modules are also possible (not shown). Especially data distribution between different types of PU's, e.g. having various numbers of input/output terminals, may require respectively modified modules.

For specific constellations, e.g. bus structures with large numbers of PU's or where long distances between individual modules or PU's are to bridge over, additional active photonic elements (not shown) can be included in the described data distribution systems for enhancement of transferred optical signals.

We claim:

1. A module for passively distributing optical signals, comprising
    a body having a plurality of interface areas, each of said interface areas having a plurality of data ports associated therewith for communication with the data ports of other modules or with optical signal sources or receivers;
    a plurality of discrete optical waveguides for transferring signals between individual data ports of different interfaces such that optical signals received at any one data port of an interface of said module are sent to a corresponding data port of another interface of said module,
    whereby each interface includes a sufficient number of data ports to enable signal transfer between that interface and all other interfaces of said module.

2. A module according to claim 1, wherein said interfaces comprise substantially identical sets of data ports.

3. A module according to claim 1, wherein said optical waveguides comprise lines of transparent material, channels with at least partially reflective walls, or optical fibers.

4. A module according to claim 3, wherein said optical waveguides are located on or embedded within a substrate.

5. A module according to claim 3, wherein all of said optical waveguides are coplanar.

6. A module according to claim 1 wherein adjacent parts of different optical waveguides are arranged so as to inhibit optical interference or cross-talk effects.

7. A module according to claim 6 wherein said optical waveguides are arranged such that at their crossing points said waveguides are substantially perpendicular to one another.

8. An optical distribution system for data transfer between optical transmitter/receiver units, each such optical transmitter/receiver unit comprising at least one optical transmitter coupled to a plurality of output ports and a plurality of optical receivers each coupled to an input port, all of said ports being associated with an interface area communicable with an interface area of a module according to claim 1, comprising
    a plurality of modules according to claim 1, coupled together through selected ones of their interface areas and being coupleable to transmitter/receiver units through selected others of said interface areas.

9. An optical distribution system according to claim 8, wherein said modules are of substantially identical shape.

10. An optical distribution system according to claim 8, including active photonic elements for enhancement of transferred optical signals.

11. An optical distribution system for data transfer between optical transmitter/receiver units, comprising
    a plurality of transmitter/receiver units, each such optical transmitter/receiver unit comprising at least one optical transmitter coupled to a plurality of output ports and a plurality of optical receivers each coupled to an input port, all of said ports being associated with an interface area communicable with an interface area of a module according to claim 1;
    a plurality of modules according to claim 1, coupled together through selected ones of their interface areas and coupled to said transmitter/receiver units through selected others of said interface areas.

* * * * *